US008169601B2

(12) United States Patent
Maruo et al.

(10) Patent No.: US 8,169,601 B2
(45) Date of Patent: May 1, 2012

(54) PHOTOLUMINESCENT HEAT-SHRINKABLE FILMS

(75) Inventors: Masaharu Maruo, Moriyama (JP); Akira Morikawa, Moriyama (JP); Naoki Ohno, Moriyama (JP); Tadayoshi Tanaka, Moriyama (JP)

(73) Assignee: Gunze Limited, Ayabe-shi (JP)

( * ) Notice: Subject to any disclaimer, the term of this patent is extended or adjusted under 35 U.S.C. 154(b) by 358 days.

(21) Appl. No.: 12/312,958

(22) PCT Filed: Nov. 30, 2007

(86) PCT No.: PCT/JP2007/073186
§ 371 (c)(1), (2), (4) Date: Jun. 2, 2009

(87) PCT Pub. No.: WO2008/069132
PCT Pub. Date: Jun. 12, 2008

(65) Prior Publication Data

US 2010/0026987 A1 Feb. 4, 2010

(30) Foreign Application Priority Data

Dec. 8, 2006 (JP) ................................ 2006-331920

(51) Int. Cl.
*G01J 3/00* (2006.01)

(52) U.S. Cl. ......................................................... 356/51

(58) Field of Classification Search .................... 356/51, 356/239.4; 428/35.1; 252/301.35
See application file for complete search history.

(56) References Cited

U.S. PATENT DOCUMENTS 4,604,307 A * 8/1986 Spreeuwers ................ 428/34.2
6,270,866 B1 8/2001 Okuda et al.
6,413,596 B1 * 7/2002 Okuda et al. ................ 428/34.7
6,682,662 B2 1/2004 Usami et al.
2009/0202851 A1 * 8/2009 Maruichi et al. .............. 428/483
2009/0311503 A1 * 12/2009 Maruo et al. .................. 428/220

FOREIGN PATENT DOCUMENTS

EP 0979722 A1 2/2000
EP 1178076 A1 2/2002
(Continued)

OTHER PUBLICATIONS

Supplementary European Search Report dated Sep. 7, 2010, for European Patent Application No. 07859694.7.
International Search Report dated Feb. 12, 2008, issued on PCT/JP2007/073186.

*Primary Examiner* — Roy M Punnoose
(74) *Attorney, Agent, or Firm* — Edwards Wildman Palmer LLP

(57) ABSTRACT

A primary object of the present invention is to provide a multilayer heat-shrinkable styrene-based film that makes it possible, even when the film is transparent, to confirm that the film is correctly applied on a drink bottle and the like as a label. The present invention provides a heat-shrinkable styrene-based film having at least one layer containing a styrene-based resin containing a copolymer b1 of 98 to 40% by weight vinyl aromatic hydrocarbon and 2 to 60% by weight aliphatic unsaturated carboxylic acid ester, and/or a block copolymer b2 of 70 to 85% by weight vinyl aromatic hydrocarbon and 15 to 30% by weight conjugated diene hydrocarbon, and a fluorescent brightening agent in an amount of 100 to 2,000 weight ppm with respect to the total weight of the styrene-based resin. The present invention also provides a heat-shrinkable film having a three-layer structure containing front and back layers and a core layer, wherein the above-mentioned copolymer b1 and/or copolymer b2 forms the core layer.

5 Claims, 1 Drawing Sheet

FOREIGN PATENT DOCUMENTS

| | | |
|---|---|---|
| JP | 61-041543 | 2/1986 |
| JP | 08-080567 | 3/1996 |
| JP | 2000-143836 | 5/2000 |
| JP | 2002-046231 | 2/2002 |
| JP | 2004-107843 | 4/2004 |
| JP | 2004-149958 | 5/2004 |
| JP | 2005-133282 | 5/2005 |
| JP | 2006-044179 | 2/2006 |

* cited by examiner

PHOTOLUMINESCENT HEAT-SHRINKABLE FILMS

TECHNICAL FIELD

The present invention relates to a heat-shrinkable styrene-based film comprising a fluorescent brightening agent.

BACKGROUND ART

In recent years, along with the spread of PET bottle drinks, beverage manufacturers have been selling a large variety of products. These PET bottle products are decorated with design-focused labels for the purpose of clearly differentiating them from other brands, improving their image among customers, etc. For such labels, polystyrene-based shrinkable films are widely used. They are often wrapped around the body of the container during the production of PET bottle drinks. Recently, transparent and colorless labels (transparent and colorless labels refer to those on which only patterns are printed, rather than those on which full solid printing is performed) have also begun to be used from a design standpoint, e.g., harnessing the color of the content. Usually, the correct application of a label is checked using a label inspection machine. More specifically, the position of a printed label is confirmed by a CCD camera etc. However, when transparent and colorless labels are applied, it is difficult to confirm the label position, causing line troubles.

Patent Document 1: Japanese Unexamined Patent Publication No. 1996-80567

DISCLOSURE OF THE INVENTION

Problems to be Solved by the Invention

A primary object of the present invention is to provide a heat-shrinkable styrene-based film that makes it possible, even when the film is transparent and colorless, to easily check whether the film is correctly applied on a drink bottle etc. as a label.

Means for Solving the Problem

The present inventors carried out intensive research to solve the above-described problem, and achieved a heat-shrinkable styrene-based film that makes it possible, even when the film is transparent and colorless, to easily check whether the film is correctly applied as a label, by mixing a fluorescent brightening agent in a resin that forms a heat-shrinkable film. The present invention was accomplished upon further studies based on this finding.

The present invention provides a heat-shrinkable styrene-based film described below.

Item 1. A heat-shrinkable styrene-based film having at least one layer comprising:

a styrene-based resin comprising a copolymer b1 of 98 to 40% by weight vinyl aromatic hydrocarbon and 2 to 60% by weight aliphatic unsaturated carboxylic acid ester, and/or a block copolymer b2 of 70 to 85% by weight vinyl aromatic hydrocarbon and 15 to 30% by weight conjugated diene hydrocarbon; and a fluorescent brightening agent in an amount of 100 to 2,000 weight ppm with respect to the total weight of the styrene-based resin.

Item 2. The film according to Item 1, wherein the styrene-based resin is mixed with 0.8 to 2.5 parts by weight of a high impact polystyrene resin, and 0.02 to 0.15 parts by weight of organic fine particles having a mean particle diameter of 0.5 to 5 μm, with respect to 100 parts by weight of the styrene-based resin.

Item 3. A heat-shrinkable styrene-based film having at least three layers including front and back layers (A) and a core layer (B), wherein the core layer (B) comprises the heat-shrinkable styrene-based film of Item 1 or 2, and the front and back layers (A) comprise a block copolymer of 75 to 90% by weight vinyl aromatic hydrocarbon and 10 to 25% by weight conjugated diene hydrocarbon.

Item 4. A heat-shrinkable styrene-based film having at least the three layers according to Item 3, wherein each of the front and back layers (A) further comprises, with respect to 100 parts by weight of a resin forming each the front and back layers (A), 0.8 to 2.5 parts by weight of a high impact polystyrene resin and 0.02 to 0.15 parts by weight of organic fine particles having a mean particle diameter of 0.5 to 5 μm.

Item 5. A method for confirming the application of a film on a container, comprising the steps of:

irradiating the film according to any one of Items 1 to 4 applied on the container with UV; and detecting light emission from the film.

Item 6. A container on which the film according to any one of Items 1 to 4 is applied.

Item 7. A method of producing a multilayer heat-shrinkable styrene-based film having front and back layers (A) and a core layer (B), comprising the steps of:

extrusion-molding a block copolymer of a vinyl aromatic hydrocarbon and a conjugated diene hydrocarbon for forming the front and back layers (A), a copolymer b1 and/or a copolymer b2, and a fluorescent brightening agent for forming the core layer (B), the extrusion-molding being performed in such a way that the block copolymer forms the front and back layers, and the copolymer b1 and/or the copolymer b2, and the fluorescent brightening agent form the core layer (B);

and stretching the extrudate.

Effect of the Invention

The feature of the heat-shrinkable styrene-based film of the present invention is to contain a fluorescent brightening agent, which makes the film fluorescent by UV irradiation. For example, using such a film as a label for a drink bottle, whether the label is correctly applied on the bottle can be easily confirmed by irradiation with UV, even when the label is transparent and colorless.

BEST MODE FOR CARRYING OUT THE INVENTION

Heat-Shrinkable Styrene-Based Film

Figure 1:
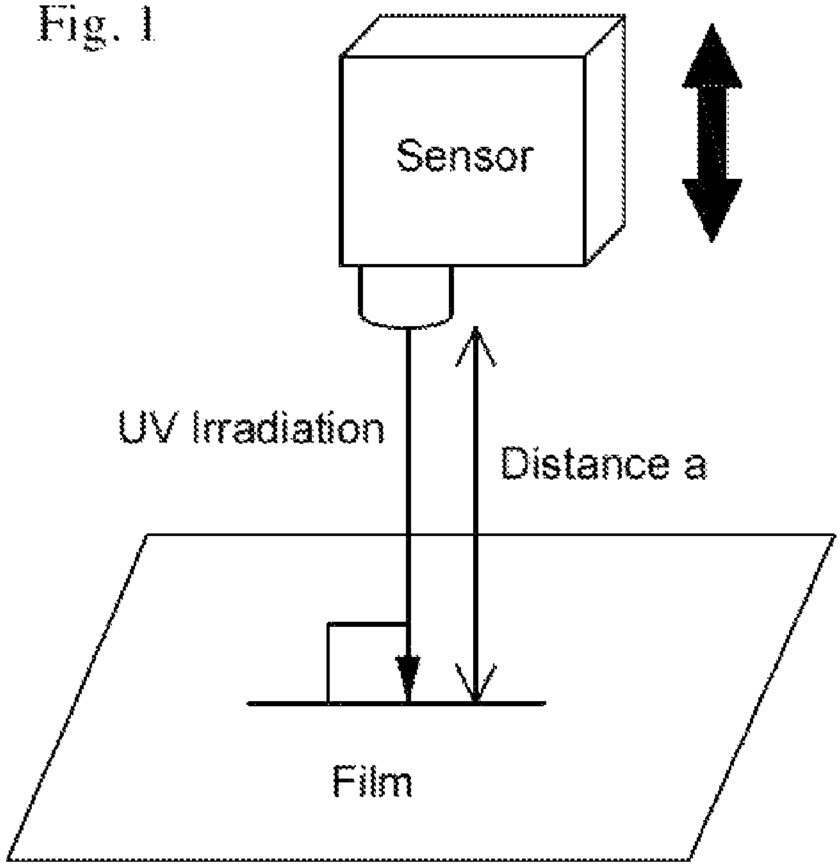
FIG. 1 schematically illustrates an apparatus used for the evaluation of fluorescent emission.

One feature of the heat-shrinkable styrene-based film of the present invention is to contain a fluorescent brightening agent. The film may take the form of a single-layer film or a multilayer film. The film of the present invention is explained below.

1. Single-Layer Film

The heat-shrinkable styrene-based film of the present invention can be formed into a single-layer film by adding a fluorescent brightening agent to a copolymer b1 (a copolymer of 98 to 40% by weight vinyl aromatic hydrocarbon and 2 to 60% by weight aliphatic unsaturated carboxylic acid ester) and/or a copolymer b2 (a block copolymer of 70 to 85% by weight vinyl aromatic hydrocarbon and 15 to 30% by weight conjugated diene hydrocarbon), and then forming the mixture into a film shape. The copolymer b1 or b2 may be further mixed with, as required, organic fine particles and/or a high impact polystyrene resin for the purpose of improved blocking resistance, etc.

(i) Copolymer b1

Copolymer of Vinyl Aromatic Hydrocarbon and Aliphatic Unsaturated Carboxylic Acid Ester Examples of vinyl aromatic hydrocarbons usable in the layer of the film of the present invention include styrene, o-methylstyrene, p-methylstyrene, 2,4-dimethylstyrene, 2,5-dimethylstyrene, α-methylstyrene, etc.; styrene is preferred.

Moreover, examples of usable aliphatic unsaturated carboxylic acid esters include methyl (meth)acrylate, butyl (meth)acrylate, 2-ethylhexyl (meth)acrylate, lauryl (meth) acrylate, stearyl (meth)acrylate, and the like. Here, the above-mentioned (meth)acrylate refers to acrylate and/or methacrylate. A preferable aliphatic unsaturated carboxylic acid ester is butyl (meth)acrylate.

Among copolymers of such a vinyl aromatic hydrocarbon and such an aliphatic unsaturated carboxylic acid ester, a preferable combination is, for example, the combination of styrene and butyl acrylate.

A copolymer of a vinyl aromatic hydrocarbon and an aliphatic unsaturated carboxylic acid ester as described above may be used alone. Alternatively, a combination of two or more kinds of copolymers of a vinyl aromatic hydrocarbon and an aliphatic unsaturated carboxylic acid ester having different compositions may also be used. More specifically, a combination of two or more kinds of copolymers having different proportions of vinyl aromatic hydrocarbon and aliphatic unsaturated carboxylic acid ester may be used, and two or more kinds of copolymers having different combinations of vinyl aromatic hydrocarbon and aliphatic unsaturated carboxylic acid ester may also be used.

The MFR of the copolymer b1 (temperature: 200° C., load: 49.03 N) is about 2 to about 15 g/10 min, and preferably about 4 to about 9 g/10 min.

The vinyl aromatic hydrocarbon content in the copolymer b1 is about 98 to about 40% by weight, preferably about 95 to about 75% by weight, and more preferably about 85 to about 75% by weight. The aliphatic unsaturated carboxylic acid ester content is about 2 to about 60% by weight, preferably about 5 to about 25% by weight, and more preferably about 15 to about 25% by weight.

When the vinyl aromatic hydrocarbon content is 40% by weight or more, the Vicat softening temperature of the copolymer b1 is not lowered, providing natural shrinkage resistance to the film of the present invention. When the vinyl aromatic hydrocarbon content is 98% by weight or less, the Vicat softening temperature of the copolymer b1 does not excessively increase, providing excellent shrinkability, especially low-temperature shrinkability, to a film.

(ii) Copolymer b2

Block Copolymer of Vinyl Aromatic Hydrocarbon and Conjugated Diene Hydrocarbon

Examples of vinyl aromatic hydrocarbons are the same as in the copolymer b1. For example, styrene, o-methylstyrene, p-methylstyrene, 2,4-dimethylstyrene, 2,5-dimethylstyrene, α-methyl styrene, etc. can be used; styrene is preferred.

Examples of conjugated diene hydrocarbons include 1,3-butadiene, 2-methyl-1,3-butadiene (isoprene), 2,3-dimethyl-1,3-butadiene, 1,3-pentadiene, 1,3-hexadiene, etc.; 1,3-butadiene or isoprene is preferred.

A block copolymer of a vinyl aromatic hydrocarbon and a conjugated diene hydrocarbon as described above may be used alone. Alternatively, a combination of two or more kinds of block copolymers of a vinyl aromatic hydrocarbon and a conjugated diene hydrocarbon having different compositions may also be used. More specifically, a combination of two or more kinds of block copolymers having different proportions of vinyl aromatic hydrocarbon and conjugated diene hydrocarbon may be used; two or more kinds of block copolymers having different combinations of vinyl aromatic hydrocarbon and conjugated diene hydrocarbon may also be used.

Among copolymers of such a vinyl aromatic hydrocarbon and such a conjugated diene hydrocarbon, a preferable combination is, for example, the combination of styrene and 1,3-butadiene.

The MFR of the copolymer b2 (temperature: 200° C., load: 49.03 N) is about 2 to about 15 g/10 min, and preferably about 4 to about 9 g/10 min.

The vinyl aromatic hydrocarbon content in the copolymer b2 is about 70 to about 85% by weight, and preferably about 75 to about 80% by weight. The conjugated diene hydrocarbon content is about 15 to about 30% by weight, and preferably about 20 to about 25% by weight.

A vinyl aromatic hydrocarbon content of 70% by weight or more enhances the rigidity and natural shrinkage resistance of the film; and a content of 85% by weight or less does not lower the impact strength and thermal shrinkage. A content within such a range is thus desirable.

The single-layer heat-shrinkable styrene-based film of the present invention may be formed through the use of either the copolymer b1 or b2 alone, or the combined use of both. A copolymer of a vinyl aromatic hydrocarbon and an aliphatic unsaturated carboxylic acid ester as described above (copolymer b1) provides rigidity and natural shrinkage resistance to the film. However, such a copolymer is hard and brittle, and the resulting impact resistance may be poor. Therefore, for the purpose of providing sufficient impact resistance to the film of the present invention, the copolymer b1 is preferably used in combination with a block copolymer of a vinyl aromatic hydrocarbon and a conjugated diene hydrocarbon (copolymer b2). This makes it possible to obtain a film having high rigidity, excellent natural shrinkage resistance, and excellent breaking resistance.

When used in combination, the proportion of the copolymers b1 and b2 is not limited as long as the effect of the present invention can be achieved. Generally, the amount of the copolymer b2 is about 0.05 to about 10 parts by weight, preferably about 0.1 to about 5 parts by weight, and more preferably about 0.2 to about 2 parts by weight, with respect to 1 part by weight of copolymer b1.

(iii) Fluorescent Brightening Agent

When the heat-shrinkable styrene-based film of the present invention is used as a transparent label applied on a beverage container etc., a fluorescent brightening agent contained in the film makes it possible to easily confirm the application of the label on the container by UV irradiation.

The fluorescent brightening agent used in the present invention can be selected from those well known, as appropriate. Examples include 2,5-bis(5-t-butylbenzoxazol-2-yl) thiophene, 4,4'-bis(benzoxazol-2-yl)stilbene, etc.; 2,5-bis(5-t-butylbenzoxazol-2-yl)thiophene is preferred. Commercially available fluorescent brightening agents can also be used. Examples include UVITEX OB (manufactured by Ciba Specialty Chemicals Inc.), Kayalight (manufactured by Nippon Kayaku Co., Ltd.), and the like.

The fluorescent brightening agent content in the film of the present invention is about 100 to about 2,000 weight ppm, preferably about 300 to about 1,500 weight ppm, and more preferably about 400 to about 1,200 weight ppm, based on the total weight of the styrene-based resin. When the fluorescent brightening agent content is less than the above range, light emission is small, making the detection of light emission on the actual production line difficult. Whereas, when the content is overly large, light emission occurs even in response to fluorescent lamps and ultraviolet rays contained in natural light, lowering the commercial value of the film.

(iv) High Impact Polystyrene

The copolymer b1 or b2 may be mixed with a high impact polystyrene, as required.

Examples of the high impact polystyrene usable in the present invention include styrene-butadiene rubber obtained by graft-polymerization of styrene and butadiene (styrene-butadiene graft polymer); and a resin obtained by dissolving polybutadiene rubber in a styrene monomer, followed by bulk polymerization, solution polymerization, suspension polymerization, or simple mechanical mixing of the obtained polymers. Commercially available products such as Toyo Styrol E640 (manufactured by Toyo Styrene Co., Ltd.) and PSJ-polystyrene H6872 (manufactured by PS Japan Corporation) may also be used. Generally, high impact polystyrene has a two-phase structure of a polystyrene phase and a rubber phase, a so-called sea-island structure, in which a rubber phase is dispersed in a polystyrene phase.

The particle diameter of the rubber phase dispersed in the polystyrene phase is preferably about 1 to about 3 μm, and more preferably about 2 to about 2.5 μm. When the particle diameter of the rubber phase is more than 1 μm or more, the film surface is modified, thereby reducing the likelihood of blocking and like problems. When the particle diameter of the rubber phase is 3 μm or less, defects due to ink skipping during the printing process are less likely to occur.

The MFR of the high impact polystyrene used in the present invention (temperature: 200° C., load: 49.03 N) is preferably about 1.5 to about 10 g/10 min, and more preferably about 2 to about 8 g/10 min.

In the present invention, the high impact polystyrene content is about 0.8 to about 2.5 parts by weight, preferably about 1 to about 2 parts by weight, and more preferably about 1 to about 1.8 parts by weight, per 100 parts by weight of the copolymer b1 and/or copolymer b2. A high impact polystyrene content of 0.8 parts by weight or more reduces the likelihood of blocking between film surfaces, and a content of 2.5 parts by weight or less does not lower the transparency of the film. A content within such a range is thus desirable.

(v) Organic Fine Particles

The copolymer b1 or b2 may further contain organic fine particles, as required.

Examples of usable organic fine particles include polymethylmethacrylate, polystyrene, methyl methacrylate-styrene copolymer, etc.; methyl methacrylate-styrene copolymer is preferred. These organic fine particles may be used singly or in combination of two or more. In the present invention, organic fine particles may be either a cross-linked product or a non-cross-linked product. Commercially available organic fine particles may also be used in the present invention. Examples thereof include Ganzpearl (manufactured by Ganz Chemical Co. Ltd.), Art Pearl (manufactured by Negami Chemical Industrial Co., Ltd.), and the like.

The mean particle diameter of the organic fine particles used in the present invention is about 0.5 to about 5 μm, and preferably about 1 to about 4 μm. A mean particle diameter of 0.5 μm or more provides excellent effects to improve the lubricity and blocking resistance, and a mean particle diameter of 5 μm or less reduces the likelihood of ink skipping and the like during the printing process. A mean particle diameter within such a range is thus desirable. In the present invention, a combination of organic fine particles having different diameters may also be used.

The organic fine particle content is about 0.02 to about 0.15 parts by weight, preferably about 0.04 to about 0.12 parts by weight, and more preferably about 0.05 to about 0.12 parts by weight, per 100 parts by weight of the copolymer b1 and/or copolymer b2. An organic fine particle content of 0.02 parts by weight or more provides excellent effects to improve the lubricity and blocking resistance, and a content of 0.15 parts by weight or less does not lower the transparency of the film. A content within such a range is thus desirable.

(vi) Other Components

In addition to these components (i) to (v), the heat-shrinkable styrene-based film of the present invention may contain a thermoplastic elastomer, lubricant, antistatic agent, or other known additives, for the purpose of enhancing the impact resistance, lubricity, antistatic properties, and other properties.

The heat-shrinkable styrene-based film of the present invention can be formed into a single-layer film using a common method to suitably stretch a composition containing the above-mentioned components. The stretching method is not limited; however, it is preferable to use a tenter.

The thickness of the single-layer heat-shrinkable styrene-based film of the present invention is about 20 to about 80 μm, preferably about 30 to about 70 μm, and more preferably about 40 to about 60 μm.

2. Multilayer Film

Figure 2:
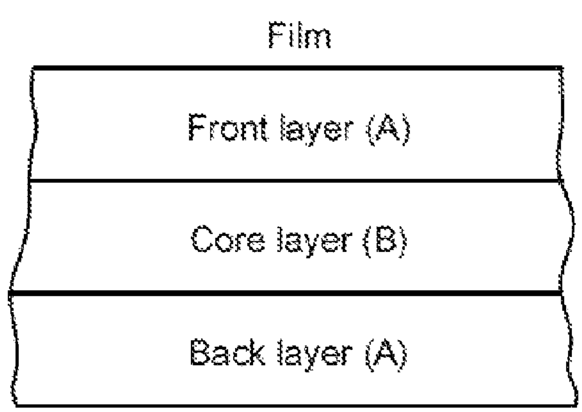
FIG. 2 illustrates a film with three layers.

When the heat-shrinkable styrene-based film of the present invention is formed into a multilayer film, the multilayer film has at least three layers including the above-mentioned single-layer film as a core layer (B), and front and back layers (A), shown by example in FIG. 2 and described later. The following explains the components that form front and back layers.

(1) Front and Back Layers (A)

The front and back layers (A) are formed of a block copolymer of a vinyl aromatic hydrocarbon and a conjugated diene hydrocarbon.

(i) Block Copolymer of Vinyl Aromatic Hydrocarbon and Conjugated Diene Hydrocarbon Examples of vinyl aromatic hydrocarbons usable in the present invention include styrene, o-methylstyrene, p-methylstyrene, 2,4-dimethylstyrene, 2,5-dimethylstyrene, α-methylstyrene, etc.; styrene is preferred.

Examples of usable conjugated diene hydrocarbons include 1,3-butadiene, 2-methyl-1,3-butadiene (isoprene), 2,3-dimethyl-1,3-butadiene, 1,3-pentadiene, 1,3-hexadiene, etc.; 1,3-butadiene or isoprene is preferred.

Among block copolymers of such a vinyl aromatic hydrocarbon and such a conjugated diene hydrocarbon, a preferable combination is, for example, the combination of styrene and 1,3-butadiene.

A copolymer of a vinyl aromatic hydrocarbon and a conjugated diene hydrocarbon as described above may be used alone. Alternatively, a combination of two or more kinds of copolymers of a vinyl aromatic hydrocarbon and a conjugated diene hydrocarbon having different compositions may also be used. More specifically, a combination of two or more kinds of block copolymers having different proportions of vinyl aromatic hydrocarbon and conjugated diene hydrocarbon may be used, and two or more kinds of block copolymers having different combinations of vinyl aromatic hydrocarbon and conjugated diene hydrocarbon may also be used.

The vinyl aromatic hydrocarbon content in such a block copolymer is about 75 to about 90% by weight, preferably about 80 to about 90% by weight, and more preferably about 80 to about 85% by weight. The conjugated diene hydrocarbon content in the block copolymer is about 10 to about 25% by weight, preferably about 10 to about 20% by weight, and more preferably about 15 to about 20% by weight. A vinyl aromatic hydrocarbon content of 75% by weight or more reduces the likelihood of blocking during heating of the film, and a content of 90% by weight or less does not lower the thermal shrinkage. A content within such a range is thus desirable.

The MFR of the block copolymer (temperature: 200° C., load: 49.03N) is 2 to 15 g/10 min, and preferably 4 to 9 g/10 min.

In the front and back layers (A), the above-mentioned block copolymer may be mixed with organic fine particles and/or high impact polystyrene. Organic fine particles and high impact polystyrene to be added to the front and back layers (A) are as described in (iv) and (v) of the above Section 1 under the heading "Single-Layer Film". The contents of organic fine particles and high impact polystyrene may be determined with reference to those per copolymer b2. In the multilayer film of the present invention, the constituents, the amount of each constituent, etc., of the core layer (B) are as described above with regard to the single-layer film. When the film of the present invention is formed into a multilayer film, it is preferable to add organic fine particles and high impact polystyrene to the front and back layers (A), rather than the core layer (B).

A typical example of the multilayer film of the present invention includes front and back layers (A) and a core layer (B), and has a structure of (A) layer/(B) layer/(A) layer. According to other embodiments of the present invention, the film may include an intermediate layer (C) in addition to the layers (A) and (B), and have a five-layer structure of (A) layer/(C) layer/(B) layer/(C) layer/(A) layer or (A) layer/(B) layer/(C) layer/(B) layer/(A) layer. Here, for such a layer (C), a styrene homopolymer (GPPS), a styrene-conjugated diene block copolymer hydrogenation product (SEBS, SIBS, etc.), a mixture of the resins that form the layers A and B, and the like can be used.

The total thickness of the multilayer heat-shrinkable styrene-based film of the present invention is about 30 to about 70 μm, preferably about 35 to about 65 μm, and more preferably about 40 to about 60 μm. Each of the front and back layers (A) has a thickness of about 2.7 to about 10 μm, and preferably about 3.2 to about 9.2 μm; and the core layer (B) has a thickness of about 20 to about 49 μm, and preferably about 23.4 to about 45 μm. The thickness ratio of the core layer (B) to either of the front and back layers (A) is such that, provided that the thickness of the front or back layer (A) is 1, that of the core layer (B) is 2 to 9, preferably 4 to 9, and more preferably 5 to 9. The thickness of the intermediate layer (C) may suitably be determined based on the total thickness of the film and each thickness of the front and back layer (A) and core layer (B).

In order to prevent the film from curling etc., the thickness of the front and back layers (A) is preferably the same.

The heat-shrinkable styrene-based film of the present invention, both in the form of a single-layer film and a multilayer film, has shrinking properties as described below. When the film is immersed in 70° C. warm water for 10 seconds, the shrinkage percentage in the main shrinkage direction is about 10 to about 30%; when immersed in boiling water for 10 seconds, the shrinkage percentage in the main shrinkage direction is about 65 to about 80%. The desired shrinking properties differ depending on the shape of the container, the extent to which the label covers the container, and the application conditions (speed, the use of a wet-heat or a dry-heat tunnel, etc.). Therefore, the shrinkage percentage should preferably cover a certain range.

The shrinkage percentage can be measured in the following manner. A sample of 100×100 mm is cut out from the film, and immersed in warm water of a predetermined temperature for 10 seconds, and removed. The length of the sample is then measured. The direction in which the shrinkage is greater (the direction in which the length is shorter) is defined as the main shrinkage direction. Defining the length in this direction as L mm, (100-L) is calculated as shrinkage percentage.

Further, the heat-shrinkable styrene-based film of the present invention has a haze value, measured in accordance with the method described in Test Example 2 below, of about 2 to about 5%, and preferably about 3 to about 4.6%.

Method of Producing Heat-Shrinkable Styrene-Based Film

The heat-shrinkable styrene-based film of the present invention can be produced in accordance with conventionally known film production methods.

The method of producing the film of the present invention may be, for example, as follows: a method of producing a multilayer heat-shrinkable styrene-based film having front and back layers (A) and a core layer (B), comprising the steps of extrusion molding a block copolymer of a vinyl aromatic hydrocarbon and a conjugated diene hydrocarbon (and organic fine particulates and high impact polystyrene) for forming front and back layers (A), and a copolymer b1 and/or a copolymer b2, and a fluorescent brightening agent for forming a core layer (B), the extrusion molding being performed in such a way that the block copolymer (and the organic fine particles and high impact polystyrene) forms the front and back layers, and the copolymer b1 and/or copolymer b2, and the fluorescent brightening agent form the core layer (B); and stretching the extrudate.

Here, the block copolymer of a vinyl aromatic hydrocarbon and a conjugated diene hydrocarbon (and the organic fine particles and high impact polystyrene), the copolymers b1 and b2, and the fluorescent brightening agent are as described above.

A specific example of the production method is as follows.

When producing a multilayer heat-shrinkable styrene-based film having a structure of (A) layer/(B) layer/(A) layer, a resin for forming each layer is placed in a single-screw extruder at a barrel temperature of 160 to 190° C., and extruded through a multi-manifold die at a temperature of 185 to 200° C. into a plate-like shape. The extruded resin is cooled and solidified using a winding roll adjusted to 20 to 50° C. Subsequently, the resin is stretched 1 to 1.5 times in a longitudinal direction in a roll stretching machine adjusted to 80 to 85° C., by the velocity difference of a low-speed roll to a high-speed roll. Then, the resin is stretched 5 to 6 times in a transverse direction in a tenter stretching machine at a preheating zone (100 to 110° C.) and a stretching zone (80 to 90° C.). The resin is heat-set in a fixing zone (60 to 70° C.), and then wound up by a winder to obtain a roll film.

The single-layer heat-shrinkable styrene-based film of the present invention can be obtained by suitably stretching a resin composition containing the above-mentioned components in accordance with conventionally known methods so as to have a desired thickness. Stretching conditions may be suitably determined by a person skilled in the art, with reference to the above-described example of the method of producing a multilayer heat-shrinkable styrene-based film.

Use Application

The heat-shrinkable styrene-based film of the present invention can be used as a label for a container. Examples of containers include PET bottles, glass bottles, and the like. The multilayer heat-shrinkable styrene-based film of the present invention is closely attached to these containers by thermal shrinkage using conventional methods to serve as a label for the container.

For example, when the heat-shrinkable styrene-based film of the present invention is used as a label for a PET bottle, first, both ends of the film of the present invention in a flat shape are joined by center-sealing to form a tube-like shape (tubular shape). Then, a PET bottle is covered with the tubular-shaped film of the present invention, and heated in a wet-heat tunnel using steam at about 70 to about 130° C. for about 2 to about 15 seconds. In the case of a dry-heat tunnel using a hot blast, the film is heated at about 100 to about 250° C. for about 5 to about 30 seconds, and the film is thereby heat-shrunk and closely attached to the PET bottle. A PET bottle labeled with the film of the present invention can be thus obtained.

In addition to the above use, the heat-shrinkable styrene-based film of the present invention can be suitably used for cap sealing, belt labeling, bundled packaging, stacked packaging, and the like.

In recent years, design-related demands for the labels of drink bottles etc. have increased. From a design standpoint, such as when utilizing the color of the drinks, transparent labels may be used. In the present invention, the transparent labels refer to, for example, labels on which very few patterns of characters, drawings, etc., are printed, or labels which, although colored, make it possible, when applied on a drink bottle etc., to see the contents of the bottle. Since the film of the present invention emits light upon UV irradiation, when the film is applied on a drink container etc. as a transparent label, the application of the film on the container can easily be confirmed by UV irradiation.

Conditions for the confirmation of label application are not limited, and can be determined by a person skilled in the art, as appropriate. For example, the emission of the label can be confirmed by irradiating the film with ultraviolet light having a wavelength of 360 to 400 nm at a distance of 10 to 300 mm from the film. Light sources for use in the detection are not limited as long as they can emit light having a wavelength in the above range. For example, ultraviolet LED light can be used.

A suitable embodiment of the single-layer heat-shrinkable styrene-based film of the present invention is a film designed to exhibit equivalent performance to the above-mentioned multilayer heat-shrinkable styrene-based film containing high impact polystyrene and organic fine particles, wherein high impact polystyrene and organic fine particles containable in the front and back layers (A) of the multilayer film, and a fluorescent brightening agent contained in the core layer (B) are contained in one layer.

Further, the heat-shrinkable styrene-based film of the present invention has excellent transparency, rigidity, natural shrinkage resistance, impact strength, and other properties. Moreover, when the film is formed into a multilayer film, the addition of a block copolymer of a vinyl aromatic hydrocarbon and a conjugated diene hydrocarbon to the core layer provides excellent impact resistance to the film.

EXAMPLES

The present invention is described in detail below with reference to Examples and Test Examples; however, the present invention is not limited thereto.

Example 1

Front and Back Layers (A)

As a starting material for each of the front and back layers (A), a composition containing 100 parts by weight of a styrene-butadiene block copolymer (styrene: 85% by weight, 1,3-butadiene: 15% by weight; MFR: 6 g/10 min (temperature: 200° C., load: 49.03 N); Vicat softening point: 84° C.), 1.2 parts by weight of a high impact polystyrene resin (Toyo Styrol E640; manufactured by Toyo Styrene Co., Ltd.; MFR: 2.7 g/10 min (temperature: 200° C., load: 49.03 N), Vicat softening point: 92° C.), and 0.06 parts by weight of organic fine particles (cross-linked methyl methacrylate-styrene copolymer particles; mean particle diameter: 3.3 μm) was fed into a single-screw extruder (one extruder for each of the front layer and the back layer) at a barrel temperature of 160 to 190° C.

Core Layer (B)

As starting materials for the core layer (B), 50 parts by weight of a styrene-butyl acrylate copolymer (styrene: 80% by weight; butyl acrylate: 20% by weight; MFR: 6 g/10 min (temperature: 200° C., load: 49.03 N); Vicat softening point: 65° C.), 50 parts by weight of a styrene-butadiene block copolymer (styrene: 75% by weight; 1,3-butadiene: 25% by weight; MFR: 7 g/10 min (temperature: 200° C., load: 49.03 N)), and 2,5-bis(5-t-butylbenzoxazol-2-yl)thiophene (900 ppm) as a fluorescent brightening agent were used. In addition, 8 parts by weight of a styrene-butadiene block copolymer (styrene: 40% by weight, 1,3-butadiene: 60% by weight; MFR: 7 g/10 min (temperature: 200° C., load: 49.03 N)) was added to these starting materials, for the purpose of improved impact resistance of the film.

Production of Multilayer Heat-Shrinkable Styrene-Based Film

The starting materials for the core layer (B) were fed into a single-screw extruder at a barrel temperature of 160 to 190° C., and extruded, together with the starting material for the front and back layers (A), into a plate-like sheet from a multilayer die adjusted at a temperature of 190° C. The sheet was wound onto a winding roll at 25° C., and then cooled and solidified. Thereafter, the sheet was stretched about 1.3 times in the longitudinal direction in a longitudinal stretching machine having a heating roll adjusted at a temperature of 85° C. The sheet was then stretched about 5.5 times in the transverse direction in a tenter stretching machine having a preheating zone at 110° C. and a stretching zone at 90° C. After annealing at 70° C., the sheet was wound up by a winder to obtain a rolled multilayer heat-shrinkable styrene-based film.

The total thickness of the obtained multilayer film was 50 μm, and the thickness of each layer was 7 μm, 36 μm, and 7 μm, respectively.

According to the formulation shown in Table 1 below, multilayer heat-shrinkable styrene-based films of Examples 2 to 3 and 7 to 10, and Comparative Examples 1 to 4 were produced in the same manner as in Example 1. The components for forming each layer were the same materials as in Example 1. The total thickness and the thickness of each layer of multilayer films of Examples 2 to 3 and 7 to 10, and Comparative Examples 1 to 4 were also the same as in Example 1.

Examples 4 to 6

In Examples 4 to 6, multilayer heat-shrinkable styrene-based films were obtained in the same manner as in Example 1 except that a composition containing 25 parts by weight of the composition forming the front and back layers (A) and 75 parts by weight of the resin forming the core layer (B) was used as a core layer (C) to form a structure of (A) layer/(C) layer/(B) layer/(C) layer/(A) layer.

The total thickness of the obtained multilayer film was 50 µm, and the thickness of each layer was 6 µm, 2 µm, 34 µm, 2 µm, and 6 µm, respectively.

Examples 11 to 13

In Examples 11 to 13, compositions in accordance with the formulation shown in Table 1 were used as starting materials. Each composition was fed into a single-screw extruder at a barrel temperature of 160 to 190° C., and extruded into a plate-like sheet from a single-layer die adjusted at a temperature of 190° C. The sheet was wound onto a winding roll at 25° C., and then cooled and solidified. Thereafter, the sheet was stretched about 1.3 times in the longitudinal direction in a longitudinal stretching machine having a heating roll adjusted at 85° C. The sheet was then stretched about 5.5 times in the transverse direction in a tenter stretching machine having a preheating zone at 110° C. and a stretching zone at 90° C. After annealing at 70° C., the sheet was wound up by a winder to obtain a single-layer film of a rolled heat-shrinkable styrene-based film.

In another method, a single-layer film can be produced by feeding starting materials having the same composition into a plurality of extruders and using a multilayer die, as in Example 1.

The thickness of each single-layer film of Examples 11 to 13 was 50 µm. The high impact polystyrene and organic fine particles used were the same as Example 1.

Comparative Examples 1 to 7

In Comparative Example 1 to 7, multilayer films (Comparative Examples 1 to 4) were produced in the same manner as in Example 1, and single-layer films (Comparative Examples 5 to 7) were produced in the same manner as in Examples 11 to 13, except that compositions having the formulations shown in Table 1 were used as starting materials, and that the amount of the fluorescent brightening agent was changed.

TABLE 1

| | Front and back layers (A) | | Core layer (B) | | Intermediate layer (C) | |
|---|---|---|---|---|---|---|
| Ex. 1 | Styrene/1,3-butadiene = 85 wt. %/15 wt. % | 100 pts. wt. | Styrene/butyl acrylate = 80 wt. %/20 wt. % | 50 pts. wt. | | |
| | High impact polystyrene | 1.2 pts. wt. | Styrene/1,3-butadiene = 75 wt. %/25 wt. % | 50 pts. wt. | | |
| | Organic fine particles | 0.06 pts. wt. | Styrene/1,3-butadiene = 40 wt. %/60 wt. % | 8 pts. wt. | | |
| | | | Fluorescent brightening agent | 900 ppm | | |
| Ex. 2 | Styrene/1,3-butadiene = 85 wt. %/15 wt. % | 100 pts. wt. | Styrene/butyl acrylate = 80 wt. %/20 wt. % | 80 pts. wt | | |
| | High impact polystyrene | 1.2 pts. wt. | Styrene/1,3-butadiene = 70 wt. %/30 wt. % | 20 pts. wt. | | |
| | Organic fine particles | 0.06 pts. wt. | Styrene/1,3-butadiene = 40 wt. %/60 wt. % | 8 pts. wt. | | |
| | | | Fluorescent brightening agent | 900 ppm | | |
| Ex. 3 | Styrene/1,3-butadiene = 85 wt. %/15 wt. % | 100 pts. wt. | Styrene/1,3-butadiene = 80 wt. %/20 wt. % | 100 pts. wt. | | |
| | High impact polystyrene | 1.2 pts. wt. | Fluorescent brightening agent | 900 ppm | | |
| | Organic fine particles | 0.06 pts. wt. | | | | |
| Ex. 4 | Styrene/1,3-butadiene = 85 wt. %/15 wt. % | 100 pts. wt. | Styrene/butyl acrylate = 80 wt. %/20 wt. % | 50 pts. wt. | Resin composition for front and back layers (A) | 25 pts. wt. |
| | High impact polystyrene | 1.2 pts. wt. | Styrene/1,3-butadiene = 75 wt. %/25 wt. % | 50 pts. wt. | | |
| | Organic fine particles | 0.06 pts. wt. | Styrene/1,3-butadiene = 40 wt. %/60 wt. % | 8 pts. wt. | Resin composition for core layer (B) | 75 pts. wt. |
| | | | Fluorescent brightening agent | 900 ppm | | |
| Ex. 5 | Styrene/1,3-butadiene = 85 wt. %/15 wt. % | 100 pts. wt. | Styrene/butyl acrylate = 80 wt. %/20 wt. % | 80 pts. wt. | Resin composition for front and back layers (A) | 25 pts. wt. |
| | High impact polystyrene | 1.2 pts. wt. | Styrene/1,3-butadiene = 70 wt. %/30 wt. % | 20 pts. wt. | | |
| | Organic fine particles | 0.06 pts. wt. | Styrene/butadiene = 40 wt. %/60 wt. % | 8 pts. wt. | Resin composition for core layer (B) | 75 pts. wt. |
| | | | Fluorescent brightening agent | 900 ppm | | |
| Ex. 6 | Styrene/1,3-butadiene = 85 wt. %/15 wt. % | 100 pts. wt. | Styrene/1,3-butadiene = 80 wt. %/20 wt. % | 100 pts. wt. | Resin composition for front and back layers (A) | 25 pts. wt. |

TABLE 1-continued

| | Front and back layers (A) | | Core layer (B) | | Intermediate layer (C) | |
|---|---|---|---|---|---|---|
| | High impact polystyrene | 1.2 pts. wt. | Fluorescent brightening agent | 900 ppm | Resin composition for core layer (B) | 75 pts. wt. |
| | Organic fine particles | 0.06 pts. wt. | | | | |
| Ex. 7 | Styrene/1,3-butadiene = 85 wt. %/15 wt. % | 100 pts. wt. | Styrene/butyl acrylate = 80 wt. %/20 wt. % | 50 pts. wt. | | |
| | High impact polystyrene | 1.2 pts. wt. | Styrene/1,3-butadiene = 80 wt. %/20 wt. % | 50 pts. wt. | | |
| | Organic fine particles | 0.06 pts. wt. | Styrene/1,3-butadiene = 40 wt. %/60 wt. % | 8 pts. wt. | | |
| | | | Fluorescent brightening agent | 500 ppm | | |
| Ex. 8 | Styrene/1,3-butadiene = 85 wt. %/15 wt. % | 100 pts. wt. | Styrene/1,3-butadiene = 80 wt. %/20 wt. % | 100 pts. wt. | | |
| | High impact polystyrene | 1.2 pts. wt. | Fluorescent brightening agent | 500 ppm | | |
| | Organic fine particles | 0.06 pts. wt. | | | | |
| Ex. 9 | Styrene/1,3-butadiene = 85 wt. %/15 wt. % | 100 pts. wt. | Styrene/butyl acrylate = 80 wt. %/20 wt. % | 50 pts. wt. | | |
| | High impact polystyrene | 1.2 pts. wt. | Styrene/1,3-butadiene = 75 wt. %/25 wt. % | 50 pts. wt. | | |
| | Organic fine particles | 0.06 pts. wt. | Styrene/1,3-butadiene = 40 wt. %/60 wt. % | 8 pts. wt. | | |
| | | | Fluorescent brightening agent | 100 ppm | | |
| Ex. 10 | Styrene/1,3-butadiene = 85 wt. %/15 wt. % | 100 pts. wt. | Styrene/1,3-butadiene = 80 wt. %/20 wt. % | 100 pts. wt. | | |
| | High impact polystyrene | 1.2 pts. wt. | Fluorescent brightening agent | 100 ppm | | |
| | Organic fine particles | 0.06 pts. wt. | | | | |
| Ex. 11 | Styrene/butyl acrylate = 80 wt. %/20 wt. % | 50 pts. wt. | | | | |
| | Styrene/butadiene = 80 wt. %/20 wt. % | 50 pts. wt. | | | | |
| | Styrene/butadiene = 40 wt. %/60 wt. % | 8 pts. wt. | | | | |
| | High impact polystyrene | 1.2 pts. wt. | | | | |
| | Organic fine particles | 0.06 pts. wt. | | | | |
| | Fluorescent brightening agent | 615 ppm | | | | |
| Ex. 12 | Styrene/1,3-butadiene = 85 wt. %/15 wt. % | 100 pts. wt. | | | | |
| | High impact polystyrene | 1.2 pts. wt. | | | | |
| | Organic fine particles | 0.06 pts. wt. | | | | |
| | Fluorescent brightening agent | 615 ppm | | | | |
| Ex. 13 | Styrene/butadiene = 80 wt. %/20 wt. % | 100 pts. wt. | | | | |
| | High impact polystyrene | 1.2 pts. wt. | | | | |
| | Organic fine particles | 0.06 pts. wt. | | | | |
| | Fluorescent brightening agent | 615 ppm | | | | |
| Comp. Ex. 1 | Styrene/1,3-butadiene = 85 wt. %/15 wt. % | 100 pts. wt. | Styrene/butyl acrylate = 80 wt. %/20 wt. % | 50 pts. wt. | | |
| | High impact polystyrene | 1.2 pts. wt. | Styrene/1,3-butadiene = 75 wt. %/25 wt. % | 50 pts. wt. | | |
| | Organic fine particles | 0.06 pts. wt. | Styrene/1,3-butadiene = 40 wt. %/60 wt. % | 8 pts. wt | | |
| | | | Fluorescent brightening agent | 50 ppm | | |
| Comp. Ex. 2 | Styrene/1,3-butadiene = 85 wt. %/15 wt. % | 100 pts. wt. | Styrene/1,3-butadiene = 80 wt. %/20 wt. % | 100 pts. wt | | |
| | High impact polystyrene | 1.2 pts. wt. | Fluorescent brightening agent | 50 ppm | | |
| | Organic fine particles | 0.06 pts. wt. | | | | |
| Comp. Ex. 3 | Styrene/1,3-butadiene = 85 wt. %/15 wt. % | 100 pts. wt. | Styrene/butyl acrylate = 80 wt. %/20 wt. % | 50 pts. wt. | | |
| | High impact polystyrene | 1.2 pts. wt. | Styrene/1,3-butadiene = 75 wt. %/25 wt. % | 50 pts. wt. | | |
| | Organic fine particles | 0.06 pts. wt. | Styrene/1,3-butadiene = 40 wt. %/60 wt. % | 8 pts. wt | | |

TABLE 1-continued

| | Front and back layers (A) | | Core layer (B) | | Intermediate layer (C) |
|---|---|---|---|---|---|
| Comp. Ex. 4 | Styrene/1,3-butadiene = 85 wt. %/15 wt. % | 100 pts. wt. | Styrene/1,3-butadiene = 80 wt. %/20 wt. % | 100 pts. wt | |
| | High impact polystyrene | 1.2 pts. wt. | | | |
| | Organic fine particles | 0.06 pts. wt. | | | |
| Comp. Ex. 5 | Styrene/butyl acrylate = 80 wt. %/20 wt. % | 50 pts. wt. | | | |
| | Styrene/butadiene = 80 wt. %/20 wt. % | 50 pts. wt. | | | |
| | Styrene/butadiene = 40 wt. %/60 wt. % | 8 pts. wt. | | | |
| | High impact polystyrene | 1.2 pts. wt. | | | |
| | Organic fine particles | 0.06 pts. wt. | | | |
| Comp. Ex. 6 | Styrene/1,3-butadiene = 85 wt. %/15 wt. % | 100 pts. wt. | | | |
| | High impact polystyrene | 1.2 pts. wt. | | | |
| | Organic fine particles | 0.06 pts. wt. | | | |
| Comp. Ex. 7 | Styrene/butadiene = 80 wt. %/20 wt. % | 100 pts. wt. | | | |
| | High impact polystyrene | 1.2 pts. wt. | | | |
| | Organic fine particles | 0.06 pts. wt. | | | |

Test Example 1

Measurement of Sensor Reaction Distance

Fixing a film, a sensor was moved vertically with respect to the film to measure the distance a (mm) at which fluorescent emission from the film was detected (see FIG. 1). The sensor used was an LRT 440/24-150-004-S12 (manufactured by Leuze). The output at this time was 2 W, which was the maximum output of the sensor.

The longer the detected distance, the larger the amount of luminescence from the film, which facilitates detection. It is known in an actual label application line that the distance between the sensor and the label must be at least 25 mm; otherwise the sensor may come into contact with the label due to fluttering of labeled containers during running.

Test Example 2

Measurement of Haze

Samples for measurement having a dimension of 50 mm (length)×50 mm (width) (samples were cut out with the direction of the film flow being the lengthwise direction, and its transverse direction being the widthwise direction) were cut out from given positions of the films of Example 1 to 8 and Comparative Examples 1 and 2.

The obtained measurement samples were loaded into an NDH 2000 (manufactured by Nippon Denshoku Industries Co., Ltd.), and their haze values were measured according to ASTM D-1003. A haze value of 5% or lower was considered excellent. When the haze value is higher than 5%, the film becomes white and cloudy. Since printing is applied on the back side, cloudiness in the film disadvantageously deteriorates the color development property of a printed image.

TABLE 2

| | Reaction Distance (mm) | Haze (%) |
|---|---|---|
| Ex. 1 | 235 | 4.1 |
| Ex. 2 | 235 | 3.9 |
| Ex. 3 | 235 | 4.0 |
| Ex. 4 | 220 | 4.0 |
| Ex. 5 | 220 | 3.8 |

TABLE 2-continued

| | Reaction Distance (mm) | Haze (%) |
|---|---|---|
| Ex. 6 | 220 | 4.0 |
| Ex. 7 | 220 | 4.1 |
| Ex. 8 | 220 | 4.1 |
| Ex. 9 | 30 | 4.0 |
| Ex. 10 | 30 | 4.0 |
| Ex. 11 | 220 | 4.6 |
| Ex. 12 | 220 | 4.5 |
| Ex. 13 | 220 | 4.5 |
| Comp. Ex. 1 | 15 | 4.1 |
| Comp. Ex. 2 | 15 | 4.1 |
| Comp. Ex. 3 | Not reacted | 4.1 |
| Comp. Ex. 4 | Not reacted | 4.0 |
| Comp. Ex. 5 | Not reacted | 4.5 |
| Comp. Ex. 6 | Not reacted | 4.6 |
| Comp. Ex. 7 | Not reacted | 4.5 |

It was shown that when the film of the present invention is used as a bottle label and the like, the label application can be sufficiently detected even on an actual production line by UV irradiation. It was also shown that the film of the present invention has a haze value of 5% or lower, exhibiting excellent transparency.

Test Example 3

Application to PET Bottle

The film of Example 1 was applied as a label to a PET bottle. First, the film in a flat shape was made into a tube shape (tubular shape) by center-sealing to obtain a 160-mm long label having a flat width of 109 mm. Subsequently, the label was put on a 500-ml cylindrical PET bottle, and heat-shrunk in a wet-heat tunnel using steam (SH5000; manufactured by Fuji Astec, Inc.) at a preset temperature of 70° C. (first zone), 85° C. (second zone), and 100° C. (third zone) for a pass time of 7 seconds. The film was thus closely attached to the PET bottle.

The film (label) of Example 1 applied to the PET bottle in this way was closely attached to the PET bottle, and neither deformation nor excessive shrinkage was observed. Hence, the film was able to be suitably used as a label for products.

The invention claimed is:

1. A heat-shrinkable styrene-based film having at least one layer comprising:

a styrene-based resin comprising a copolymer b1 of 98 to 40% by weight vinyl aromatic hydrocarbon and 2 to 60% by weight aliphatic unsaturated carboxylic acid ester, and/or a block copolymer b2 of 70 to 85% by weight vinyl aromatic hydrocarbon and 15 to 30% by weight conjugated diene hydrocarbon; and a fluorescent brightening agent in an amount of 100 to 2,000 weight ppm with respect to the total weight of the styrene-based resin.

2. The film according to claim 1, wherein the styrene-based resin is mixed with 0.8 to 2.5 parts by weight of a high impact polystyrene resin, and 0.02 to 0.15 parts by weight of organic fine particles having a mean particle diameter of 0.5 to 5 μm, with respect to 100 parts by weight of the styrene-based resin.

3. A heat-shrinkable styrene-based film having at least three layers including front and back layers (A) and a core layer (B), wherein the core layer (B) comprises the heat-shrinkable styrene-based film of claim 1, and the front and back layers (A) comprise a block copolymer of 75 to 90% by weight vinyl aromatic hydrocarbon and 10 to 25% by weight conjugated diene hydrocarbon.

4. A heat-shrinkable styrene-based film having at least the three layers according to claim 3, wherein each of the front and back layers (A) further comprises, with respect to 100 parts by weight of a resin forming each the front and back layers (A), 0.8 to 2.5 parts by weight of a high impact polystyrene resin and 0.02 to 0.15 parts by weight of organic fine particles having a mean particle diameter of 0.5 to 5 μm.

5. A method of producing the multilayer heat-shrinkable styrene-based film of claim 1 having front and back layers (A) and a core layer (B), comprising the steps of:

extrusion-molding a block copolymer of a vinyl aromatic hydrocarbon and a conjugated diene hydrocarbon for forming the front and back layers (A), a copolymer b1 and/or a copolymer b2, and a fluorescent brightening agent for forming the core layer (B), the extrusion-molding being performed in such a way that the block copolymer forms the front and back layers, and the copolymer b1 and/or the copolymer b2, and the fluorescent brightening agent form the core layer (B); and stretching the extrudate.

* * * * *